(12) United States Patent
Wakabayashi et al.

(10) Patent No.: US 6,273,523 B1
(45) Date of Patent: Aug. 14, 2001

(54) BRAKE ASSEMBLY FOR A MOTORCYCLE

(75) Inventors: Takeshi Wakabayashi; Kazuhiko Tani, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/426,777

(22) Filed: Oct. 26, 1999

(30) Foreign Application Priority Data

Oct. 26, 1998 (JP) .................................................. 10-303480

(51) Int. Cl.$^7$ ....................................................... B62L 3/08
(52) U.S. Cl. .......................... 303/9.61; 303/9.64; 188/349
(58) Field of Search ........................... 188/349; 303/9.61, 303/9.64, 9.69, 9.71

(56) References Cited

U.S. PATENT DOCUMENTS

| | | | |
|---|---|---|---|
| 5,219,211 | * 6/1993 | Tsuchida et al. | 303/9.64 |
| 5,273,346 | * 12/1993 | Tsuchida et al. | 303/9.64 |
| 5,544,946 | * 8/1996 | Toyoda et al. | 303/9.64 |
| 6,070,949 | * 6/2000 | Hariu et al. | 303/9.61 |
| 6,089,679 | * 7/2000 | Kushi et al. | 303/113.5 |

FOREIGN PATENT DOCUMENTS 7-196068    8/1995   (JP) .

* cited by examiner

*Primary Examiner*—Christopher P. Schwartz
(74) *Attorney, Agent, or Firm*—Birch, Stewart, Kolasch & Birch, LLP

(57) ABSTRACT

A brake assembly for a motorcycle provided with a hydraulically actuated front brake and rear brake for a front wheel and a rear wheel, respectively, including, first brake actuating means and second brake actuating means applying hydraulic pressure, and an electronic control means, having a first hydraulic system extending from the first brake actuating means connected to the front brake, and a second hydraulic system extending from the second brake actuating means connected to the rear brake, the electronic control means receiving detection values from each of a first actuation amount detection means for detecting an actuation amount of the first brake actuating means, and second actuation amount detection means for detecting an actuation amount of the second brake actuating means and subjecting the values to computation, outputting control signals to a first hydraulically controlled actuator and a second hydraulically controlled actuator based on the result of computation, and actuating the front brake using the first hydraulically controlled actuator and actuating the rear brake using the second hydraulically controlled actuator.

10 Claims, 7 Drawing Sheets

BRAKE ASSEMBLY FOR A MOTORCYCLE

BACKGROUND OF THE INVENTION

1. Field of the Invention

The present invention relates to a brake assembly for a motorcycle provided with a hydraulically driven front wheel brake and rear wheel brake, for relational control of the two brakes.

2. Background Art

A motorcycle brake actuation is carried out using a brake lever provided on the handlebar and a brake pedal provided on a step. A braking force is distributed to the front wheel brake and rear wheel brake according to actuation of each of the actuating means.

Japanese Patent Laid-open Publication No. Hei. 7-196068, discloses a brake system using partial electronic control. The brake system of this example is shown in FIG. 7.

A front wheel brake 02 and a rear wheel brake 05 are hydraulic brakes. A lever master cylinder 07 is provided on a brake lever of actuating means, while a pedal master cylinder 012 is provided on a brake pedal 011.

A lever hydraulic system 08 extending from the lever master cylinder 07 is connected to the front wheel brake 02. A pedal hydraulic system 013 extending from the pedal master cylinder 012 is connected to one port of the three port type rear wheel brake 05. A hydraulic circuit 014 branching from the pedal hydraulic system 013 is connected to a secondary master cylinder 010, and the output of the secondary master cylinder 010 is connected to the other 2 ports of the rear wheel brake 05 through a control valve 016.

A brake switch 04 opened and closed by rotation of the other brake lever 06 is provided on the brake lever 06. A pressure sensor 041 for detecting hydraulic pressure is provided in the lever hydraulic system 08. A control unit 031 determines hydraulic pressure to be generated at the secondary master cylinder 010 based on each of the detection signals from the brake switch 040 and the pressure sensor 041, and actuates an actuator 033 via a relay 032, so that the secondary master cylinder 010 generates the hydraulic pressure as determined. These devices constitute an electronically controlled braking system.

When the brake pedal 011 is actuated independently, only the rear wheel brake 05 side is actuated disassociated from the front wheel.

When the brake lever 06 is actuated independently, or at the same time as the brake lever 011, the front wheel brake 02 is actuated by hydraulic pressure of the lever master cylinder 07, and the actuator 033 is actuated based on hydraulic pressure of the lever hydraulic system 08 to generate necessary hydraulic pressure in the secondary master cylinder 010 so that the rear wheel brake is actuated by the control valve 016.

The pedal hydraulic system 013. branches into 2 sections, with pipes leading to the rear wheel brake 05 and to the secondary master cylinder 010, and the control valve 016 is located between the secondary master cylinder 010 and the rear wheel brake 05. This means that the structure has many components and is complicated, and the operation of installing the piping and also maintenance can not be carried out easily.

The layout of the piping is also subject to restrictions, and there is little degree of freedom in the design.

SUMMARY OF THE INVENTION

The present invention has been conceived in view of the above described problems, and the object of the invention is to provide a brake assembly for a motorcycle that does not restrict an operator's brake controlling operation, with electronic control independently executed with a great degree of freedom, and which can reduce the number of components and the number of assembly steps.

In order to achieve the above described object, the present invention provides a brake assembly for a motorcycle provided with a hydraulically actuated front brake and rear brake for a front wheel and a rear wheel, respectively, including a first brake actuating means and second brake actuating means applying hydraulic pressure; and an electronic control means, having a first hydraulic system extending from the first brake actuating means connected to the front brake, and a second hydraulic system extending from the second brake actuating means connected to the rear brake, with the electronic control means receiving detection values from each of a first actuation amount detection means for detecting actuation amount of the first brake actuating means, and a second actuation amount detection means for detecting an actuation amount of the second brake actuating means and subjecting the values to computation, outputting control signals to a first hydraulically controlled actuator and a second hydraulically controlled actuator based on the result of computation, and actuating the front brake using the first hydraulically controlled actuator and actuating the rear brake using, the second hydraulically controlled actuator.

If the first brake actuating means is actuated, the front wheel brake is actuated via the first hydraulic system and the actuating amount is detected by the first actuating amount detection means and output to the electronic control means. If the second brake actuating means is actuated, the rear wheel brake is actuated via the second hydraulic system, and the actuating amount is detected by the second actuating amount detecting means and output to the electronic control means.

The electronic control means carries out computation based on the inputted detected values of the actuating amount, outputs respective control signals to a first hydraulic control actuator and a second hydraulic control actuator, and the front wheel brake and rear wheel brake are actuated with optimally distributed braking force in accordance with these control signals.

The front wheel brake and rear wheel brake can be controlled by respective independent electronically controlled braking systems of the first hydraulically controlled actuator, and the second hydraulically controlled actuator, so that interference between the hydraulic pressures applied to the front and rear wheel brakes does not occur. Additionally, these brakes can perform the control operation with a large degree of freedom, and it is possible to reflect effective braking without restricting the rider's brake controlling operation.

The piping of a hydraulic system without a control valve can be simplified and shortened, the number of components can be reduced, and the piping and maintenance operations can also be made easier.

The actuation of the front wheel brake is controlled by two systems, namely the first hydraulic system and the electronically controlled braking system, which means that even if there is a failure of one system the brake can be actuated by the other system. Similarly, actuation of the rear wheel brake is controlled by the second hydraulic system and the electronically controlled braking system, so again, it can be actuated by the remaining system if one system fails.

A second aspect of the present invention is a brake assembly of the first aspect in which the first brake actuating means is a lever master cylinder, and the second brake actuating means is a pedal master cylinder.

The first hydraulic system is connected between the lever master cylinder and the front wheel brake, while the second hydraulic system is connected between the pedal master cylinder and the rear wheel brake. This means that the piping can be made short, assembly is simple and there is a large degree of design freedom.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
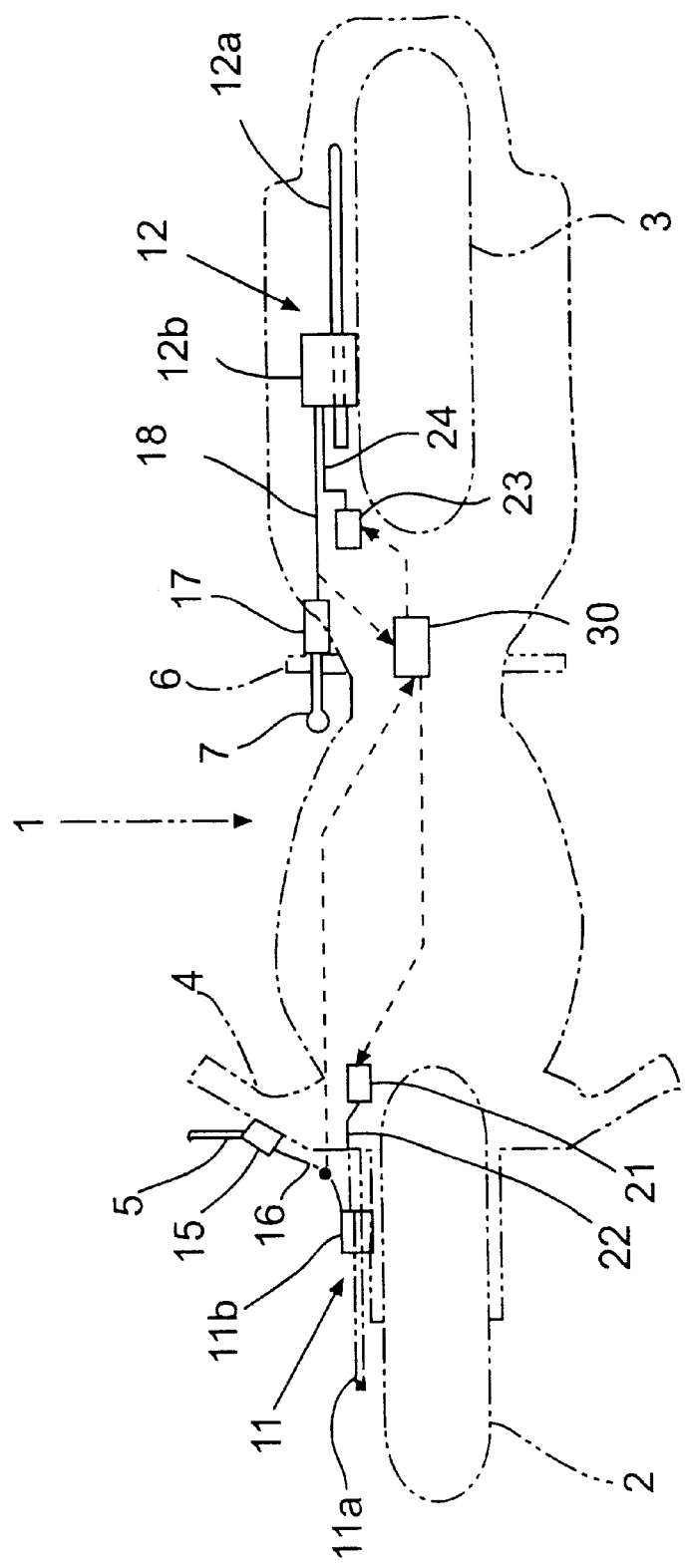
FIG. 1 is a schematic diagram showing a braking system for a motorcycle adopting the brake assembly of an embodiment of the present invention.

FIG. 1 is a schematic diagram showing a braking system for a motorcycle 1 adopting the brake assembly of an embodiment of the present invention.

An hydraulic pressure type front wheel brake 11 is provided on a front wheel 2, and a hydraulic pressure type rear brake 12 is also provided on the wheel 3. Both the front and rear brakes are disk brakes, comprising brake disks 11a and 12a, and brake calipers 11b and 12b.

A brake lever 5 is located on the right side handlebar, while a brake pedal 7 is located close to a right side step. The brake lever 5 is attached to a lever master cylinder 15, and the brake pedal 7 is attached to a pedal master cylinder 17.

Piping of a lever hydraulic system 16 extending from the lever master cylinder 15 is connected to the brake caliper 11b of the front wheel brake 11, and piping of a pedal hydraulic system 18 extending from the pedal master cylinder 17 is connected to the brake caliper 12b of the rear wheel brake 12.

An electronically controlled actuator 21 is arranged close to the front wheel brake 11, and the electronically controlled actuator 21 and the front wheel brake 11 are connected by piping of an electronically controlled lubrication system 22.

Similarly, an electronically controlled actuator 23 is arranged close to the rear wheel brake 12, and the electronically controlled actuator 23 and the rear wheel brake 12 are connected by piping of an electronically controlled lubrication system 24.

The front and rear electronically controlled actuators 21 and 23 are controlled by an electronic control unit (ECU) 30. Respective hydraulic pressure detection signals of the lever hydraulic system 16 and the pedal hydraulic system 18 are input to the ECU 30.

Figure 2:
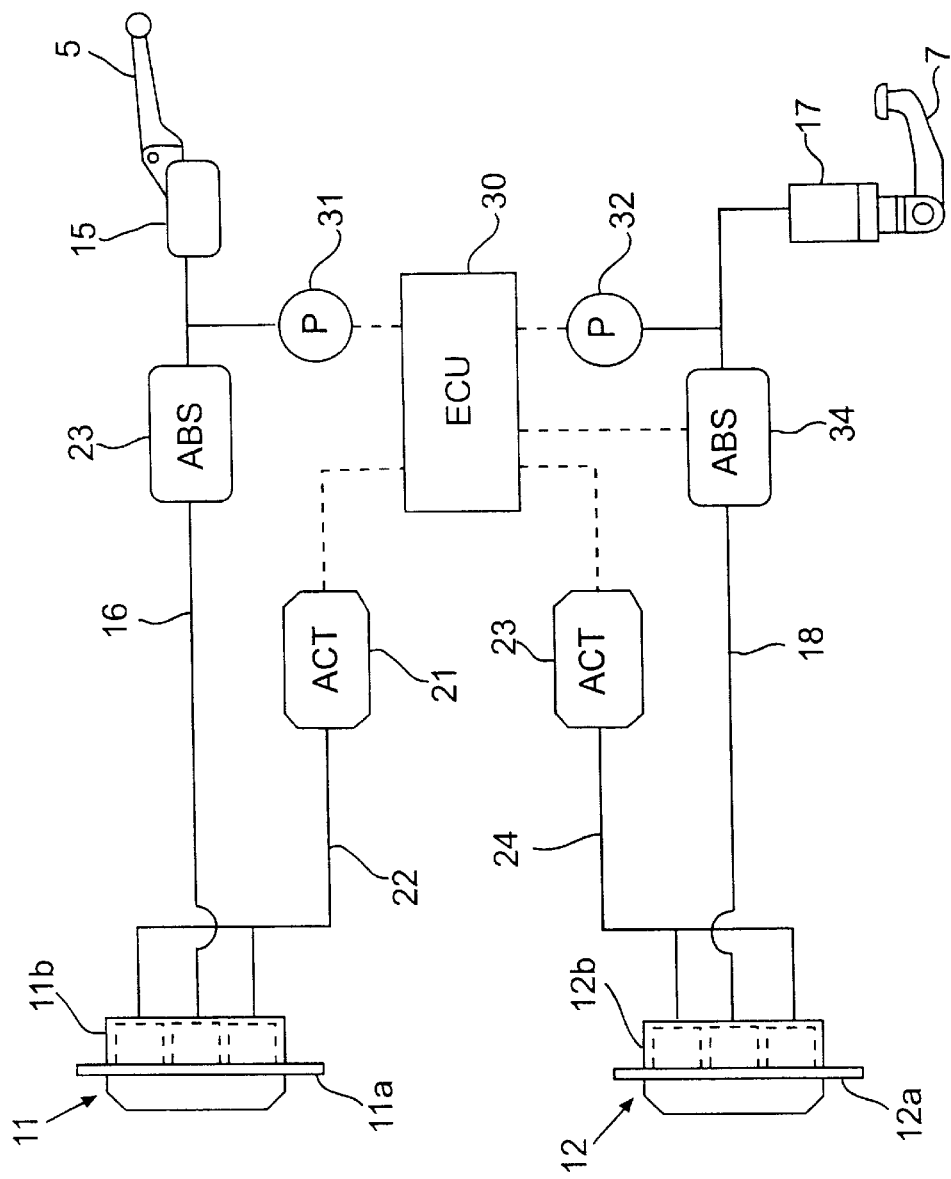
FIG. 2 is a structural diagram of the braking system shown in FIG. 1.

The structure of the brake system described above is shown in FIG. 2.

An anti-skid braking system (ABS) 23 is installed in the lever hydraulic system 16, and a pressure sensor 31 is also provided. The pressure sensor 31 detects actuation pressure generated in the lever master cylinder 15 by actuation of the brake lever 5 and outputs a detection signal to the ECU 30.

Similarly, an ABS 34 is also installed in the pedal hydraulic system 18, and a pressure sensor 32 is also provided. The pressure sensor 32 detects actuation pressure generated in the pedal master cylinder 17 by actuation of the brake pedal 7 and outputs a detection signal to the ECU 30.

The front wheel brake 11 and the rear wheel brake 12 are both three port type brakes, in which the brake calipers 11b and 12b have three pistons. One of the three ports in each caliper is connected to the lever hydraulic system 16 or the pedal hydraulic system 18, with the remaining two ports being connected to the electronically controlled hydraulic systems 22 and 24.

If the brake lever 5 is independently actuated, hydraulic pressure is supplied to the front wheel brake 11 through the lever hydraulic system 16 and the front wheel 2 is braked, and at the same time the pressure sensor 31 detects the lever actuating pressure and outputs it to the ECU 30. Suitable hydraulic pressure is then supplied to the front wheel brake 11 and the rear wheel brake 12 by controlling each of the electronically controlled actuators 21 and 23 based on this detection signal, and braking force is thus applied in an appropriately distributed manner and at an appropriate timing to the front wheel 2 and the rear wheel 3.

Similarly, if the brake pedal 7 is independently actuated, hydraulic pressure is provided to the brake caliper 12b of the rear wheel brake 12 via the pedal hydraulic system 18, the pressure sensor 32 detects the pedal actuating pressure and outputs it to the ECU 30, and the ECU 30 then carries out a computation based on this detection signal, outputs control signals to each of the electronically controlled actuators 22 and 23, and provides suitable hydraulic pressure to the front wheel brake 11 and the rear wheel brake 12 using the electronically controlled actuators 21 and 23, so that braking force is thus applied in an appropriately distributed manner and at an appropriate timing to the front wheel 2 and the rear wheel 3.

An example of the control executed by the ECU 30 at the time of independent actuation by the brake pedal 7 will be described based on the graphs of FIG. 3 and FIG. 4.

Figure 3:
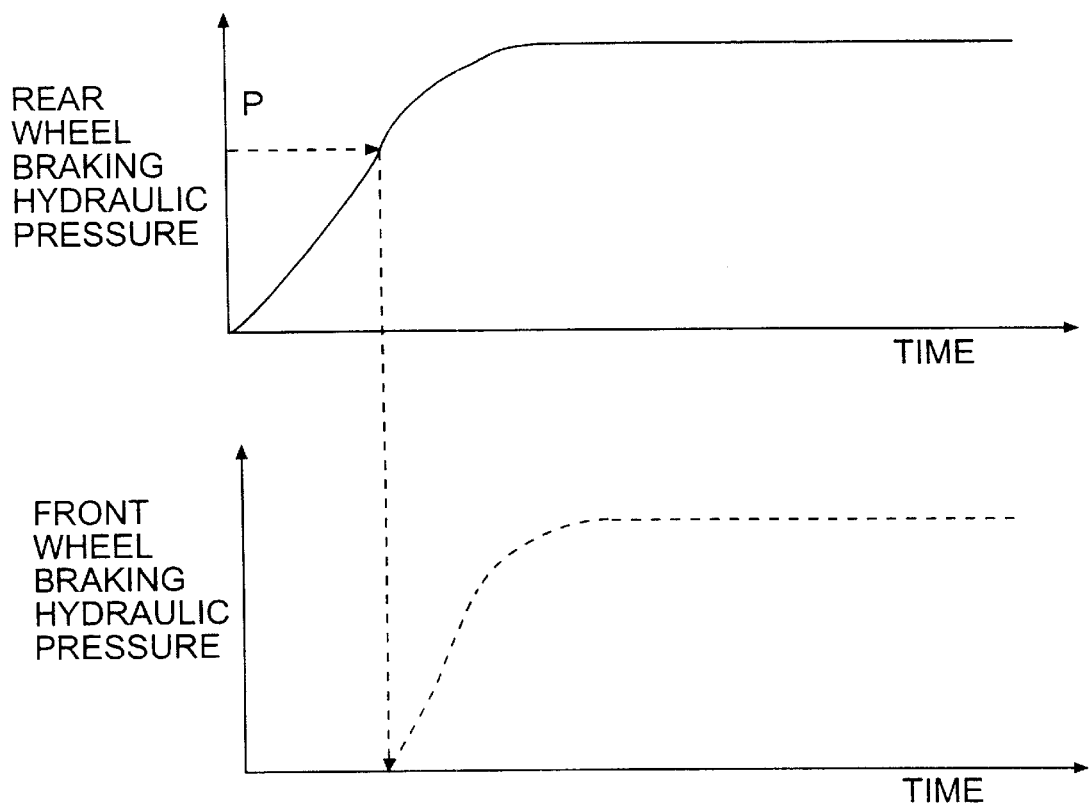
FIG. 3 is a diagram showing variations over time of rear brake hydraulic pressure and front brake hydraulic pressure when a brake pedal is independently actuated.

FIG. 3 is a drawing showing correspondence between front brake hydraulic pressure variation over time and rear brake hydraulic pressure variation over time when the brake pedal 7 is independently actuated. When the brake pedal 7 is depressed, hydraulic pressure is supplied to the rear brake through the pedal hydraulic system 18 and the rear brake hydraulic pressure is raised. If the rear brake pressure exceeds a fixed value P, the electronically controlled actuator 21 is caused to actuate and braking force is applied to the front wheel 2 by supplying hydraulic pressure to the front brake 11.

Figure 4:
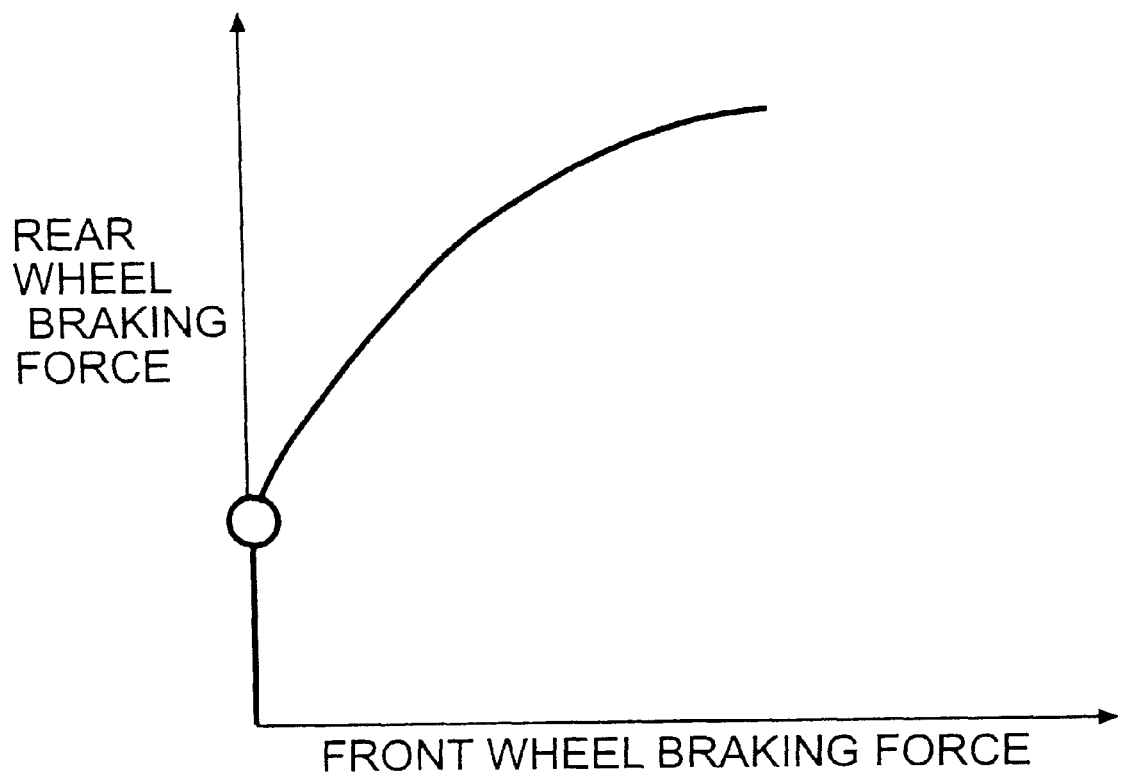
FIG. 4 is a drawing showing braking force distribution for the front brake and the rear brake when the brake pedal is independently actuated.

A distribution characteristic of the front brake force and the rear brake force under this control is shown in FIG. 4.

Specifically, if the brake pedal 7 is actuated, first of all the brake comes into contact with the rear wheel, and with further depression of the pedal the rear brake hydraulic pressure in increased and if it exceed a fixed value the front wheel brake is actuated using the electronically controlled hydraulic system 22.

Accordingly, it is possible to prevent the vehicle nose-diving at the time of braking.

In the above description, the brake pedal 7 is actuated independently without actuating the brake lever 5, but in the case where there is input to brake lever 5 before actuation of the brake pedal 7, the above described control will not be carried out.

Figure 5:
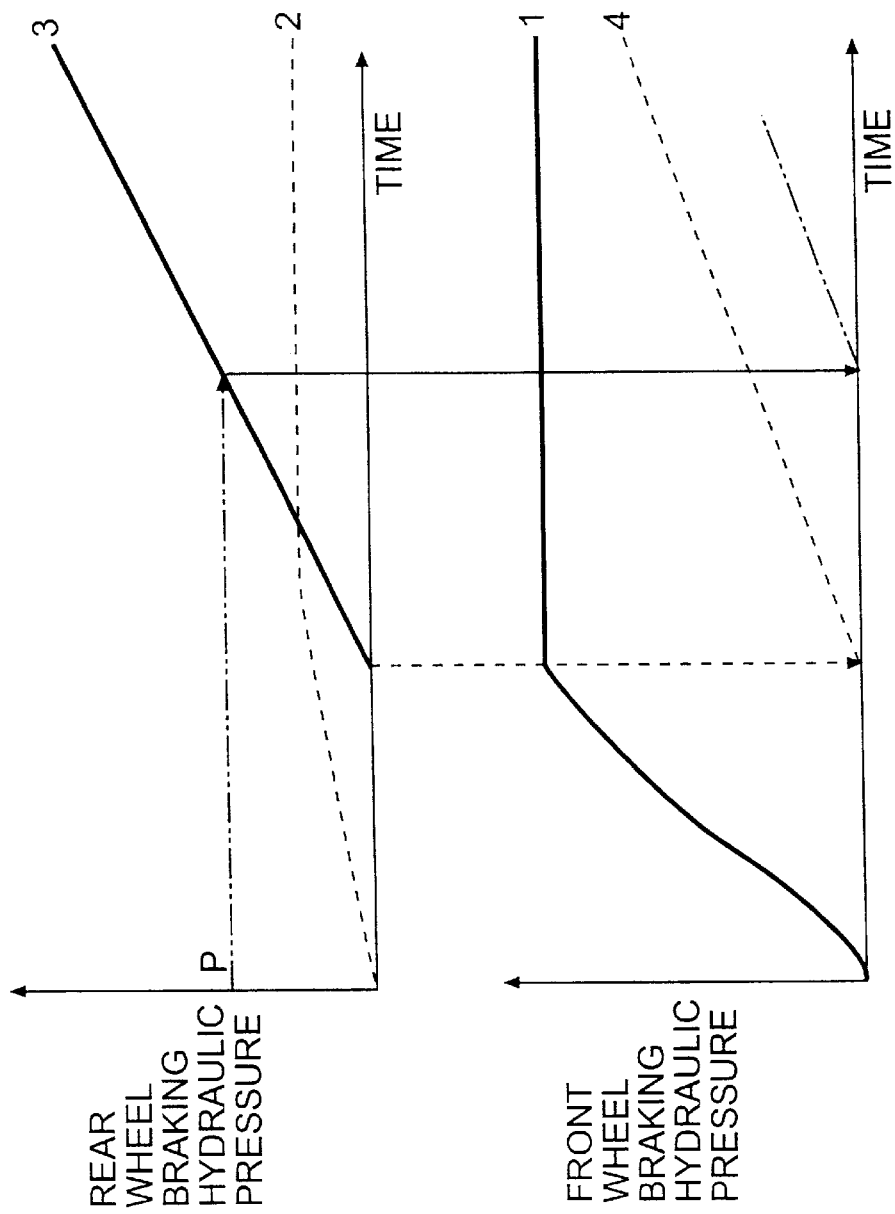
FIG. 5 is a diagram showing variations over time of rear brake hydraulic pressure and front brake hydraulic pressure when the brake pedal is actuated while the brake lever is actuated.
Figure 6:
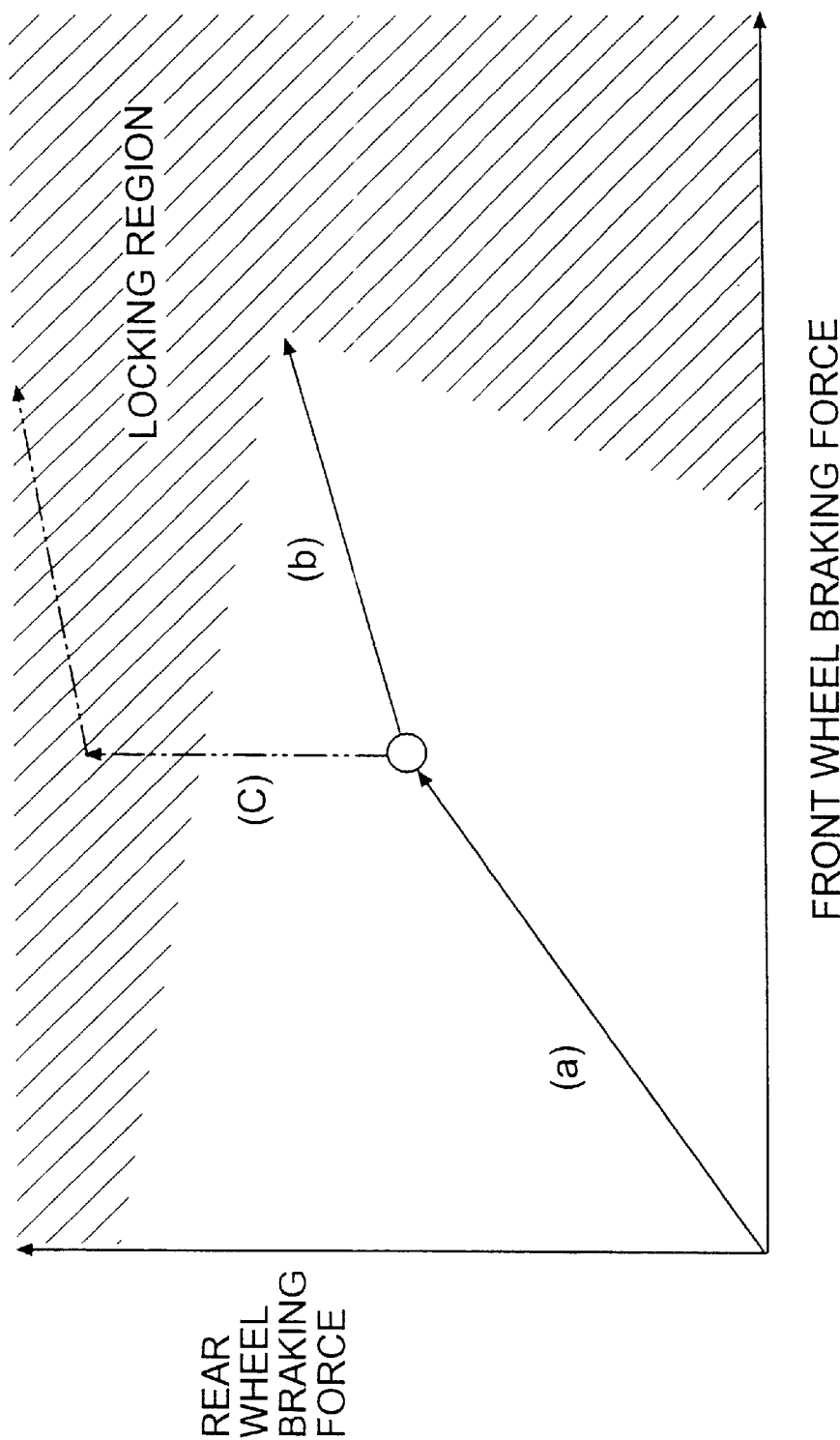
FIG. 6 is a diagram showing braking force distribution for the front brake and the rear brake when the brake pedal is actuated while the brake lever is actuated.
Figure 7:
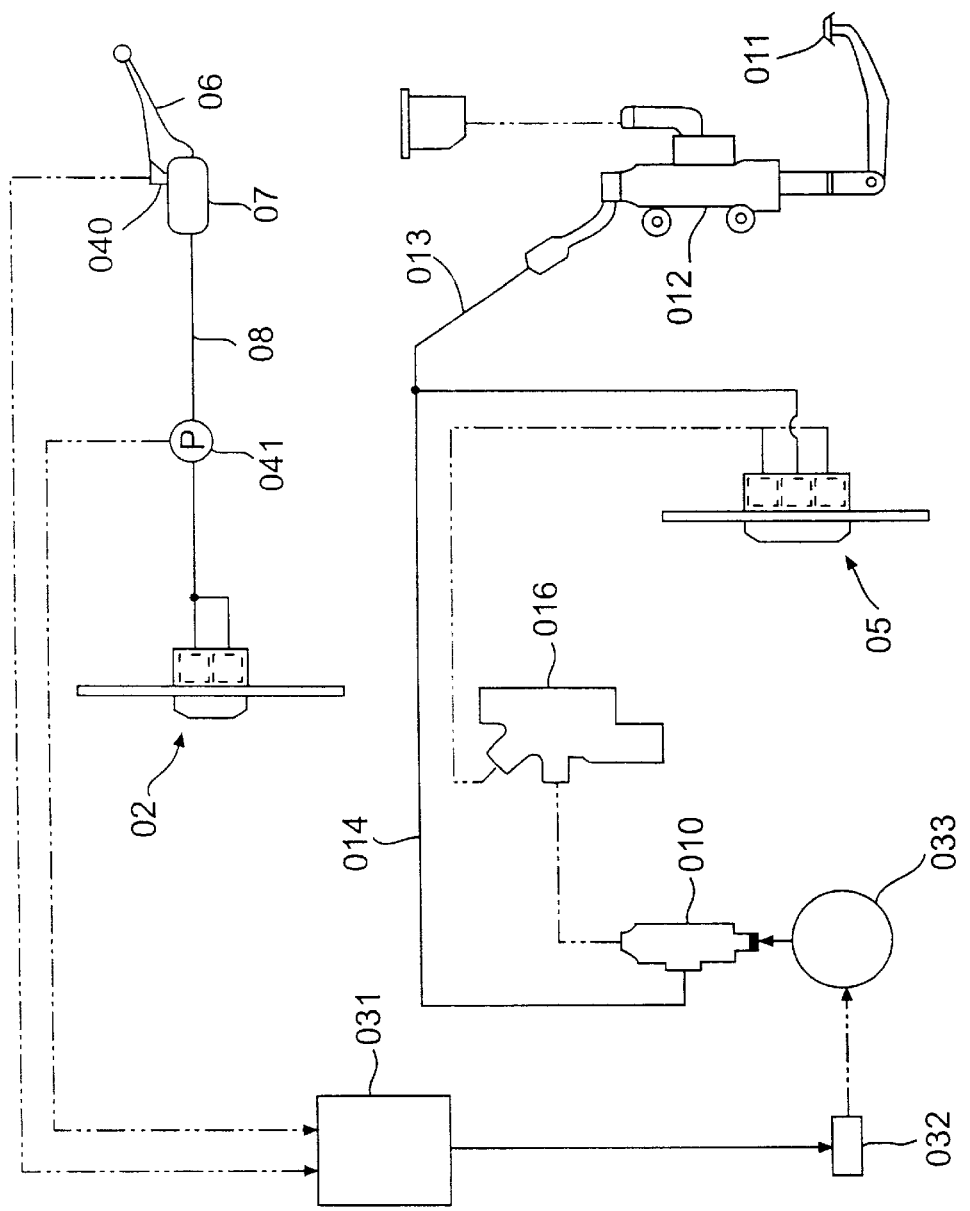
FIG. 7 is a structural diagram of a braking system of a conventional brake assembly.

An example of the control for this case is shown in FIG. 5 and FIG. 6.

In FIG. 5, showing the correspondence between variations over time of rear brake hydraulic pressure and front brake hydraulic pressure. When the brake lever 5 is actuated, hydraulic pressure is supplied to the front brake 11 through the lever hydraulic system 16 and the front brake hydraulic pressure ① is applied to the front wheel 2. At the same time, appropriately controlled hydraulic pressure is supplied to the rear brake 12 by the electronically controlled actuator 23, and the rear brake hydraulic pressure ② is applied to the rear wheel 3.

In the state where the brake lever 5 is actuated and braking force is applied in a suitably distributed manner to the front wheel 2 and the rear wheel 3, as described above, if there is input to the brake pedal 7, hydraulic pressure is supplied to the rear brake 12 through the pedal hydraulic system and the rear brake hydraulic pressure ② is further applied to the rear wheel 3.

Here, in the case where the brake pedal 7 is actuated independently, if the rear brake hydraulic pressure ③ is not equal to or greater than a fixed value P, hydraulic pressure is not supplied to the front brake 11 by the electronically controlled actuator 21, but, referring to the broken lines in the drawing, if the brake pedal 7 is actuated after the brake lever 5 has been actuated, hydraulic pressure is supplied by the electronically controlled actuator 21 to the front brake 11 at the same time as input to the brake pedal 7, and the front brake hydraulic pressure ④ is further applied to the front wheel 2.

A rear wheel braking force and front wheel braking force characteristic for this control is shown in FIG. 6.

In FIG. 6, the diagonally hatched section is a lock region where the vehicle is stationary.

First of all, the brake lever 5 is actuated and braking force is applied in a suitably distributed manner to the front wheel 2 and the rear wheel 3 (shown in the section (a) in FIG. 6). If the brake pedal 7 is now actuated, further braking force is applied simultaneously to the front wheel 2 and the rear wheel 3 as shown by the characteristic in FIG. 6, section (b). Control is carried out to lock the rear wheel at a high point of the front brake force, making it possible to obtain effective braking force.

At the time of input to the brake pedal 7, if control is carried out such as that for when the brake pedal 7 is actuated independently, as described above, only the rear brake force is further applied, as shown in FIG. 6, section (c), and the rear wheel rapidly enters the lock region, which is disadvantageous. In order to avoid this situation it is possible to apply braking force to the front wheel 2 and rear wheel 3 in an effectively distributed manner.

In this embodiment, ABS 33 and ABS 34 are respectively installed in the lever hydraulic system 16 and the pedal hydraulic system 18, which means that even if the wheels enter the lock region the locked state can be released if necessary.

As has been described above, the electronically controlled hydraulic systems 22 and 24 have the lever hydraulic system 16 and the pedal hydraulic system 18 made independently only by the hydraulic pressure, which means that no interference occurs between the two hydraulic pressures and there is increased freedom with respect to electronic control.

Also, it is possible to achieve effective braking control without restricting the braking operation of the user.

The lever hydraulic system 16 is connected between the lever master cylinder 15 and the front brake 11, while the pedal hydraulic system, 18 is connected between the pedal master cylinder 17 and the rear brake. This means that the piping can be made short.

The electronically controlled hydraulic system 22 is located close to the front brake 11, and the electronically controlled hydraulic system 24 is positioned close to the rear brake which also means the piping can be designed short, thus simplifying the piping for the hydraulic systems, reducing the number of components and making assembly and maintenance operations easy.

Actuation of the front brake 11 is controlled by two systems, namely the lever hydraulic system 16 and the electronically controlled hydraulic system 22, which means that even if one system fails, the front brake can be actuated by the other system. Similarly, actuation of the rear brake 12 is also controlled by two systems, namely the pedal hydraulic system 18 and the electronically controlled hydraulic system 24, which means that even if one system fails, the rear brake can be actuated by the other system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for actuating braking control, comprising the steps of:
    (a) actuating a brake pedal of a hydraulic brake system for increasing hydraulic pressure supplied to a rear brake means;
    (b) detecting the hydraulic pressure supplied to the rear brake;
    (c) applying a brake force to a front brake means if the hydraulic pressure detected in said detecting step (b) exceeds a predetermined level; and
    (d) preventing said applying step (c) if a front brake lever is being actuated when the brake pedal is being actuated.

2. The method of claim 1, wherein the detecting step (b) detects the hydraulic pressure via a pressure sensor.

3. The method of claim 1, wherein the applying step (c) is controlled with an electronic actuator receiving command signals from an electronic controller unit, the electronic actuator being actuateable independent of an actuation of the front brake lever.

4. A method for actuating braking control, comprising the steps of:
- (a) actuating a front brake lever of a hydraulic brake system for increasing hydraulic pressure supplied to a front brake means;
- (b) detecting the hydraulic pressure increase being supplied to the front brake means;
- (c) providing a brake force to a rear brake means once the hydraulic pressure increase is detected in the detecting step;
- (d) actuating a rear brake pedal of the hydraulic brake system for increasing hydraulic pressure to a rear brake means; and
- (e) providing additional brake force, in addition to the brake force supplied in the providing step (c), to said rear brake means once actuation of the rear brake pedal is initiated,
- wherein the providing step (c) is controlled with an electronic actuator receiving command signals from an electronic controller unit, the electronic actuator being actuateable independent of an actuation of the rear brake pedal.

5. The method of claim 4, wherein the detecting step (b) detects the hydraulic pressure via a pressure sensor.

6. The method of claim 4, wherein the steps of actuating (d) and providing (e) implement braking of the rear brake means using systems operationally independent.

7. A brake assembly for a motorcycle, comprising:
- a hydraulically actuated front brake and rear brake for a front wheel and a rear wheel, respectively;
- first brake actuating means and second brake actuating means for applying hydraulic pressure to the front and rear brakes, respectively;
- an anti-lock braking system being operationally connected to the first and second brake actuating means and the front and rear brakes; and
- electronic control means, having a first hydraulic system extending from the first brake actuating means connected to the front brake, and a second hydraulic system extending from the second brake actuating means connected to the rear brake, said electronic control means receiving detection values from each of first actuation amount detection means for detecting actuation amount of the first brake actuating means, and second actuation amount detection means for detecting actuation amount of the second brake actuating means and subjecting the values to computation, outputting control signals to a first hydraulically controlled actuator and a second hydraulically controlled actuator based on the computation result, and actuating the front brake using the first hydraulically controlled actuator and actuating the rear brake using the second hydraulically controlled actuator.

8. The brake assembly for a motorcycle of claim 7, wherein the first brake actuating means is a lever master cylinder, and the second brake actuating means is a pedal master cylinder.

9. A method for actuating braking control, comprising the steps of:
- (a) actuating a first brake actuating means of a hydraulic brake system for increasing hydraulic pressure supplied to a first brake means;
- (b) detecting the hydraulic pressure supplied to the first brake means;
- (c) applying a brake force to a second brake means if the hydraulic pressure detected in said detecting step (b) exceeds a predetermined level; and
- (d) preventing said applying step (c) if a front brake actuating means is being actuated when the first brake actuating means is being actuated.

10. The method of claim 9, wherein the detecting step (b) detects the hydraulic pressure via a pressure sensor.

* * * * *